United States Patent [19]

Vandehey

[11] 4,399,884
[45] Aug. 23, 1983

[54] ANGLE LAG CONTROL METHODS AND APPARATUS FOR LONG GROUND VEHICLES

[75] Inventor: Marvin E. Vandehey, Seattle, Wash.

[73] Assignee: The Boeing Company, Seattle, Wash.

[21] Appl. No.: 300,228

[22] Filed: Sep. 8, 1981

[51] Int. Cl.³ .................. B62D 15/00; B62D 61/10
[52] U.S. Cl. ............................... 180/79.1; 180/23; 180/141
[58] Field of Search .............. 180/22, 23, 24, 79.1, 180/134, 141, 143, 132

[56] References Cited

U.S. PATENT DOCUMENTS

| | | | |
|---|---|---|---|
| 3,280,931 | 10/1966 | Cahill et al. | 180/23 |
| 3,387,684 | 6/1968 | Belke et al. | 180/79.1 |
| 3,455,408 | 7/1969 | Larsen | 180/79.1 |
| 3,933,215 | 1/1976 | Scheverle | 180/23 |
| 4,263,979 | 4/1981 | Storgill | 180/79.1 |

Primary Examiner—David M. Mitchell
Assistant Examiner—Donn McGiehan
Attorney, Agent, or Firm—Hughes, Barnard & Cassidy

[57] ABSTRACT

An automatic control system for articulated vehicles including leading and trailing wheeled supports each having steerable wheels and each pivotally connected to, and supporting, a center frame, and where the leading support may be manually controlled; wherein: (i) a parameter indicative of distance traveled by the vehicle is continuously measured; (ii) the leading angle $\alpha_1$ between the longitudinal centerlines of the lead support and the frame is continuously measured and averaged over time and as a function of distance traveled to produce a delayed first signal representative of the time average of the leading angle $\alpha_1$; (iii) the trailing angle $\alpha_2$ between the longitudinal centerlines of the trailing support and the frame is measured to produce a signal representative of the trailing angle $\alpha_2$; (iv) the delayed first signal is compared with the second signal to produce a third signal representative of the angular difference between the trailing angle $\alpha_2$ and the time average of the leading angle $\alpha_1$; and (v) the third signal is input to an automatic control system for steering the trailing support through a steering angle $\beta$ sufficient to maintain the trailing angle $\alpha_2$ substantialy equal to the time average of the leading angle $\alpha_1$, thus permitting the trailing support to move along substantially the same path as the leading support.

40 Claims, 10 Drawing Figures

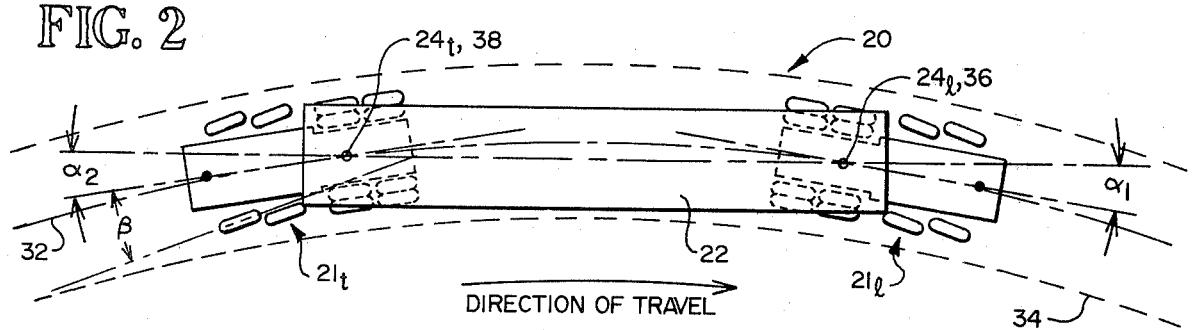
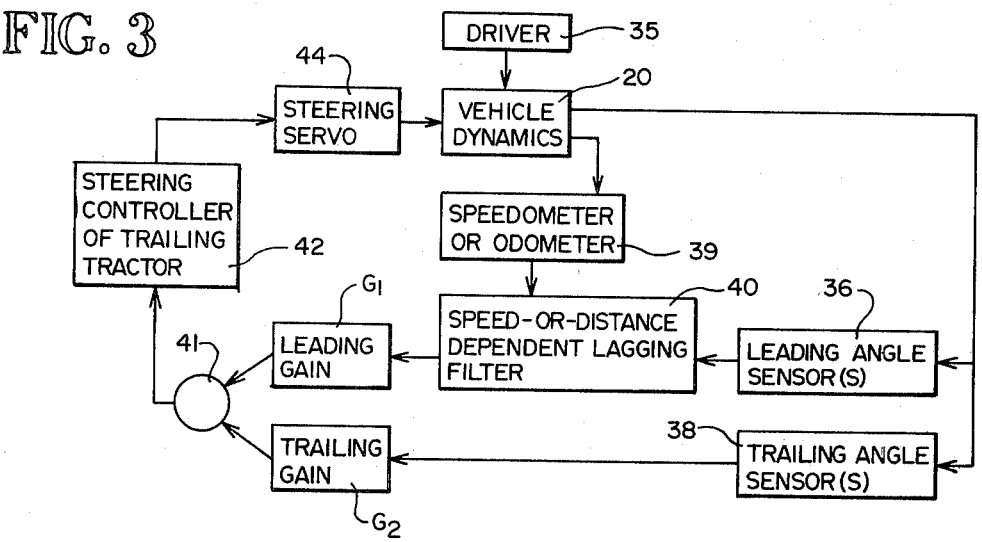
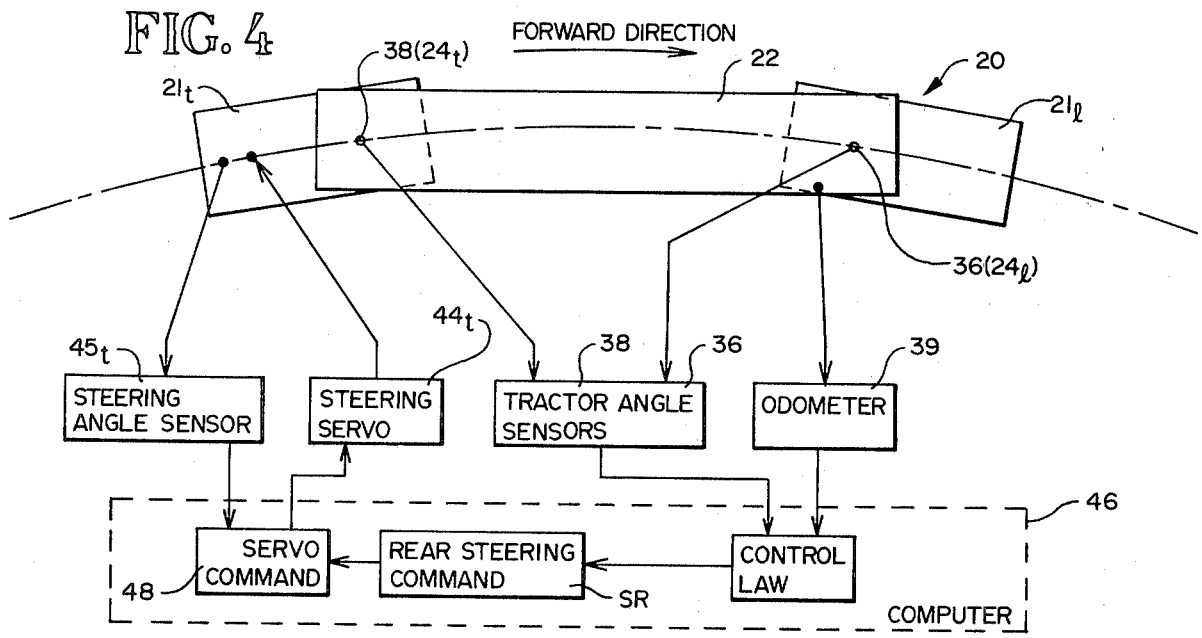

ANGLE LAG CONTROL METHODS AND APPARATUS FOR LONG GROUND VEHICLES

The Government has rights in this invention pursuant to Contract No. FO4704-78-C-0035 awarded by the U.S. Air Force.

BACKGROUND OF THE INVENTION

1. Field of the Invention

The present invention relates, in general, to a system for preventing off-tracking of relatively long power driven articulated ground vehicles of the type having a center frame and leading and trailing steerable wheeled supports pivotally connected thereto at the opposite ends of the center frame; and, more particularly, to an automatic steering control or guidance system including provisions for: (i) continuously measuring a parameter indicative of the distance traveled by the vehicle; (ii) continuously measuring the leading angle $\alpha_1$ between the longitudinal centerlines passing through the center frame and the leading wheeled support--which may take the form of a controlled tractor (controlled either automatically or manually by an operator)—to produce a first signal representative of the leading angle $\alpha_1$; (iii) processing the first signal representative of the leading angle $\alpha_1$ as a function of distance traveled to produce a lagged or delayed signal representative of the time average of the leading angle $\alpha_1$ as the vehicle traverses linear and/or curvilinear paths; (iv) measuring the trailing angle $\alpha_2$ between the longitudinal centerlines passing through the center frame and the trailing wheeled support to produce a second signal representative of the trailing angle $\alpha_2$; (v) comparing the second signal representative of the trailing angle $\alpha_2$ with the delayed first signal representative of the time average of the leading angle $\alpha_1$ so as to produce a third signal representative of the angular difference between the trailing angle $\alpha_2$ and the time average of the leading angle $\alpha_1$; and (vi) utilizing the third signal to automatically control the steering angle $\beta$ of the trailing support so as to maintain the trailing angle $\alpha_2$ substantially equal to the time average of the leading angle $\alpha_1$, thus insuring that the trailing support travels over substantially the same path as the leading support as the articulated ground vehicle traverses a prescribed path of movement. In the illustrative form of the invention, the leading and trailing wheeled supports take the form of oppositely directed tractors each employing its own motive power system, each having steerable wheels, and each capable of functioning as a lead vehicle—i.e., the articulated vehicle is capable of being driven in a forward or reverse operational mode—yet, wherein the vehicle dynamics of the trailing tractor are slaved to the vehicle dynamics of the operator controlled leading tractor with active steering of the trailing tractor being delayed by a distance related interval of time represented by the time average of the leading angle $\alpha_1$.

The present invention has been developed and is herein described in connection with the "MX Missile System"; and, is principally intended for use in transporting relatively long and heavy missiles along circuitous roadways between a multiplicity of irregularly spaced storage and launching sites. As such, the articulated vehicle to be described is extremely large; and, its intended use in transporting missiles from point-to-point in remote isolated areas of the country presents relatively unique problems in terms of accurate tracking of the trailing end of the articulated vehicle with respect to the leading end, manpower requirements, and other operating conditions peculiar to this proposed defensive missile system. However, while the invention finds particularly advantageous use with immense articulated vehicles of the type necessary to move such defensive missiles, it is not believed to be limited strictly to application to missile transport; but, rather, it is believed that the invention will find equally advantageous use with other types of long articulated ground vehicles requiring both leading and trailing steerable wheels such, merely by way of example, as long fire engines, long articulated buses, long tractor/trailers, etc.

2. Prior Art

Because of the size of the exemplary articulated vehicle to be described herein and the complete absence of comparable vehicles in the prior art, the problems encountered—for example, in maintaining proper tracking of the trailing tractor, and preventing disorientation and/or nausea inherent with operators required to man and steer a trailing tractor moving backwards—are problems which are not believed to have been experienced prior to the advent of the present invention. More specifically, there are no known prior art approaches to the problem of controlling tracking of long articulated ground vehicles of the type having a central load-supporting frame and a pair of oppositely directed tractors pivotally connected to and supporting the central frame at the opposite ends thereof, with one of the tractors being either manned for operator control or being automatically controlled, and the other of the tractors being unmanned and slaved to the vehicle dynamics of the system during normal over-the-road operation. However, numerous devices have been described in the prior art comprising mechanical and/or electromechanical designs relating to vehicle steering and propulsion systems; but, in general, such systems are not related to automatic steering of one end of an articulated vehicle with respect to the other end thereof, nor do they recognize the advantages to be achieved by steering an unmanned tractor in response to differences between: (i) a first delayed signal representative of the time average of the leading angle defined by longitudinal centerlines passing through the central frame and the leading tractor; and (ii) a second signal representative of the trailing angle defined by longitudinal centerlines passing through the central frame and the trailing tractor.

One patent of general interest is U.S. Pat. No. 2,419,812-Bedford which describes a servo control mechanism for compensating for the effects of friction upon the accuracy or performance of electrical servo systems or follow-up systems. However, the Bedford patent relates specifically to a motor control system as contrasted with a vehicle steering system; and, does not disclose or suggest an angle lag control steering system for long articulated ground vehicles.

Another prior art patent of general interest is Chu et al U.S. Pat. No. 2,996,137 which relates to a radar guidance and computer controlled automatic system for providing speed and directional control of land vehicles. This patent does not, however, disclose any means for automatically tracking one end of a vehicle with respect to the other end thereof.

Kohls U.S. Pat. No. 3,498,403 disclose a vehicle guidance control system employing active buried guide wires embedded along the desired path of vehicular movement; and, wherein vehicles are provided with an automatic steering mechanism for guiding the vehicle along the path defined by the buried guide wire with automatic steering compensations being made for deviations from the guide path. Again, the Kohls patent does not envision a steering guidance system wherein the steering controls for the trailing end of a long articulated ground vehicle are slaved to the vehicle dynamics of, for example, a manned or automatically controlled tractor at the leading end of the vehicle, with control signals generated at the leading end of the vehicle being lagged as a function of distance traveled.

SUMMARY OF THE INVENTION

It is a general aim of the present invention to provide a guidance control system for steering an unmanned steerable trailing tractor in a relatively long articulated tractor/load-supporting-frame/tractor combination as a function of overall vehicle dynamics induced by the controlled leading tractor so as to minimize off-tracking of the unmanned trailing tractor.

More specifically, it is an objective of the present invention to provide an automatic guidance control system for controlling an unmanned steerable tractor as a function of the differences in the angles measured between the centerlines passing through the controlled leading tractor and frame on the one hand and the unmanned trailing tractor and frame on the other, with those signals representative of the centerline angle between the leading tractor and frame being averaged over time and as a function of distance traveled to produce a delayed first signal representative of the time average of the leading centerline angle which is then compared with a second signal representative of the trailing centerline angle, and for maintaining the delayed time averaged leading centerline angle and the trailing centerline angle substantially equal as they traverse the path of vehicular movement, thereby insuring that the unmanned steerable trailing tractor follows essentially the same path as the manned leading tractor irrespective of curvature in the path of vehicular movement.

In one of its more detailed aspects, it is an object of the invention to provide methods and apparatus for comparing the respective angles $\alpha_1$ and $\alpha_2$ between the centerlines passing through the leading tractor and frame and the centerlines passing through the trailing tractor and frame, with those signals repesentative of the leading tractor/frame centerline angle $\alpha_1$ being averaged over time and as a function of the distance traveled to produce a delayed first signal representative of the time average of the leading centerline angle $\alpha_1$ which is then compared with a second signal representative of the trailing centerline angle $\alpha_2$; and, employing any detected differences in such first and second signals to energize the trailing tractor's steering linkage mechanism through a sufficient steering angle $\beta$ as to maintain the trailing tractor/frame centerline angle $\alpha_2$ substantially equal to the delayed time average of the leading tractor/frame centerline angle $\alpha_1$ so that the trailing tractor travels over substantially the same path as the leading tractor as the articulated vehicle traverses a prescribed path of movement, all irrespective of the curvature of the path.

In one of its more detailed aspects, it is an object of the invention to provide an automatic steering control system for the unmanned trailing steerable tractor of a long articulated ground vehicle which, because it serves to minimize off-tracking of the unmanned steerable trailing tractor, permits of use of minimum width improved road surfaces; and, since the system permits of wholly automatic unmanned operation of the trailing steerable tractor, manpower requirements and support functions are minimized.

DESCRIPTION OF THE DRAWINGS

These and other objects and advantages of the present invention will become more readily apparent upon reading the following detailed description and upon reference to the attached drawings, in which:

FIG. 2 is a highly diagrammatic block-and-line diagram here illustrating movement of a relatively long articulated ground vehicle of the type shown in FIG. 1 along a curvilinear path and, illustrating particularly the leading and trailing centerline angles $\alpha_1$ and $\alpha_2$ employed as certain of the control parameters used to preclude off-tracking of the trailing tractor which is moving backwards;

FIG. 3 is a simplified block diagram here illustrating, in a generalized functional sense, the vehicle dynamics parameters used to control steering of the unmanned steerable trailing tractor in response to controlled steering of the leading tractor, either manually, through intervention of a driver, or automatically;

FIG. 4 is a schematic block-and-line diagram illustrating over-the-road lateral control of the long articulated ground vehicle in accordance with the present invention;

Figure 1:
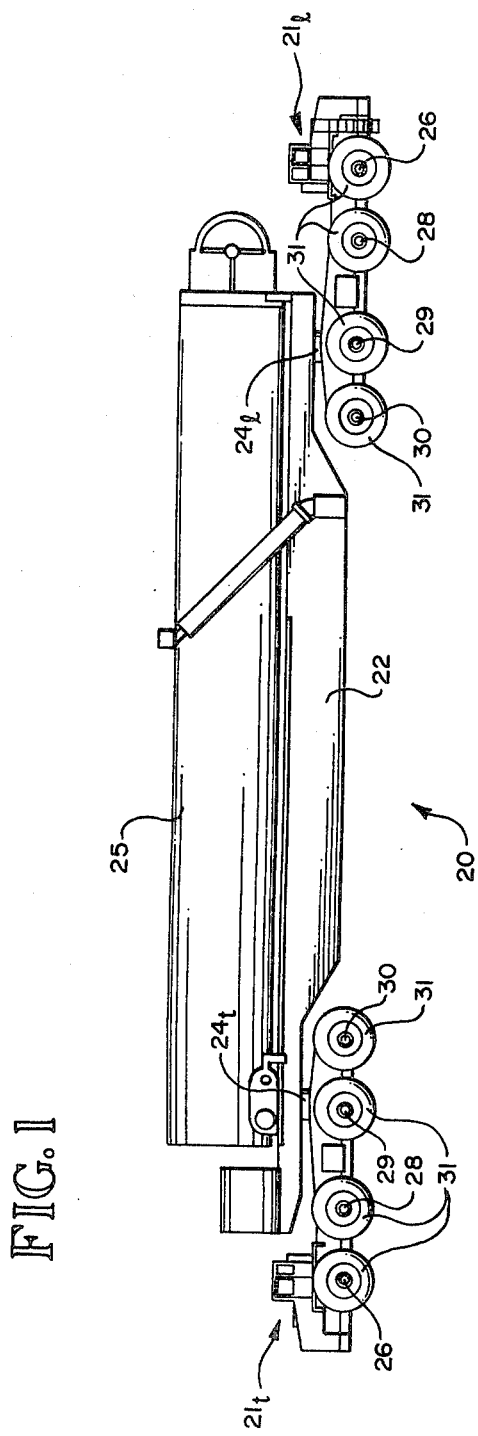
FIG. 1 is a side elevational view of an exemplary double tractor articulated ground vehicle having a central load-supporting frame which is particularly suitable for use in transporting relatively long heavy objects such, for example, as missiles, and here embodying the features of the present invention.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Turning now to the drawings, there has been illustrated in FIG. 1 an exemplary double tractor articulated long ground vehicle, generally indicated at 20, and of the type having a pair of essentially identical wheeled tractors $21_l$, $21_t$ (the subscripts "l" and "t" are used throughout the ensuing specification to respectively differentiate between leading and trailing system components of like construction and/or function, which are pivotally interconnected to, and support, the respective opposite ends of an elongate central load-supporting frame 22. As here shown, the lead tractor $21_l$ is pivotally connected to the central frame 22 at a pivot-type hitch connection $24_l$, while the trailing tractor $21_t$ is similarly pivotally connected at hitch connection $24_t$ to the opposite end of the central frame 22.

In the exemplary apparatus depicted in FIG. 1, the two tractors $21_l$ and $21_t$ are oppositely directed—that is to say, when the vehicle 20 is moving to the right as viewed in FIG. 1, the lead tractor $21_l$ is either an operator controlled or an automatically controlled tractor—i.e., it is a "master" vehicle—moving to the right in a forward direction; whereas the trailing tractor $21_t$ is an unmanned steerable tractor—i.e., it is a "slave" vehicle—moving in reverse, or backwards, and to the right as viewed in the drawing. As here shown, the vehicle 20 is intended to transport a relatively large, heavy and elongate missile 25; although, as the ensuing description proceeds, those skilled in the art will appreciate that the particular load supported on frame 22 is not critical to the present invention and may vary dependent upon the environment in which the present guidance control system is installed.

As previously indicated, the tractors $21_l$ and $21_t$ are essentially identical in construction and mode of operation, except: (i) that suitable power take-offs may be provided on either (or both) of the tractors for controlling, for example, the load carried on the frame 22; and (ii) the transmission (not shown) for the trailing tractor $21_t$ has been reversed. Thus, in the exemplary vehicle 20, the tractor $21_l$ is provided with a transmission having six forward speeds and one speed in reverse, while the transmission for the tractor $21_t$ is provided with one forward speed and six speeds in reverse. However, those skilled in the art will readily appreciate that the leading tractor $21_l$ may have "x" forward speeds and "y" reverse speeds (where "x" and "y" are any selected whole integers); provided that the trailing tractor transmission includes provision for "x" speeds in a reverse direction and "y" speeds in a forward direction.

In order to facilitate an understanding of the present invention, it may be helpful at the outset to set forth height, width, length, weight and other size parameters typified by the exemplary vehicle 20 so that the scope of the problems solved by the invention will have more meaning. Thus, in the illustrative form of the invention, the tractors $21_l$ and $21_t$ are each conventional, large, heavy-duty tractors of the type built by the Terex Division of General Motors; although, some modifications were made by the manufacturer to the control systems for such tractors to meet customer specifications, as hereinafter more fully described. Each tractor includes a first pair of steerable wheeled axles 26, 28, a power or drive axle 29, and a fixed tag axle 30. Four radial tires 31 are mounted on each of the power driven axle 29 and the tag axle 30, and two radial tires 31 are mounted on each steerable axle, with each tire being 8.5' in diameter and 2.3' in width. Each tractor is powered by a 1000 horsepower diesel engine (not shown). The vehicle 20 is believed to be the largest rubber tired special-purpose vehicle ever manufactured—being 165.5' in length, 29.8' in height, 21.8' in width, and weighing six hundred thousand (600,000) pounds when unloaded and one million four hundred and fifty thousands (1,450,000) pounds when loaded. When the vehicle is precisely located over a missile storage silo and launch site, and is in the fully erected configuration with the missile 25 oriented vertically, it is 140.3' in height. Since the particular means for on-loading and off-loading missiles 25 to and from the vehicle 20 at storage shelters or silos does not form part of the present invention, such means are not further described herein.

Turning now to FIG. 2, those skilled in the art will appreciate that as an articulated long ground vehicle 20 of the type shown in FIG. 1 traverses a prescribed path 32 having curvilinear portions, the tremendous size and weight of the vehicle would inherently present serious tracking problems even when both the leading and trailing tractors $21_l$ and $21_t$ are manned. Thus, those skilled in the art will appreciate that when the vehicle 20 is moving to the right as viewed in FIG. 2, the trailing tractor $21_t$ is moving backwards. Not only is the vision of any operator in the trailing tractor almost totally obscured but, moreover, such backward movement leads to operator disorientation and nausea. Moreover, the dusty environments in which vehicles 20 of the type shown in FIG. 1 are to be used are simply not conducive to reliable driver performance in the trailing tractor. Additionally, the use of a manned trailing tractor serves to increase operator labor costs and the costs of the necessary support facilities for extra drivers. Finally, because of the size and weight of the vehicle 20, any tendency of the trailing tractor $21_t$ to off-track with respect to the path of movement 32 along which the vehicle 20 is moving must be compensated for by increasing the width of the roadway (indicated in broken lines at 34 in FIG. 2) upon which the vehicle 20 is moving, thereby substantially increasing the cost of an overall missile deployment system which might conceivably include thousands of miles of improved roadbeds.

Still with reference to FIG. 2, those skilled in the art will appreciate that as the articulated vehicle 20 traverses the roadway 34 along the prescribed path 32 in regions where the prescribed path is curvilinear (as shown in FIG. 2), the longitudinal centerline through the leading tractor $21_l$ defines an included leading end angle $\alpha_1$ with the longitudinal centerline passing through the frame 22. Similarly, the longitudinal centerline passing through the trailing tractor $21_t$ defines an included trailing end angle $\alpha_2$ with the centerline passing through the frame 22. In order to negotiate the curvilinear path 32, the lead tractor $21_l$ is provided with a steering command—a command that may be derived directly by means of a driver turning the steering wheel of the lead tractor $21_l$, or which may be derived automatically from any desired conventional automatic control system such, for example, as control devices (not shown) imbedded in the roadway 34 and suitable sensors (not shown) mounted on the lead tractor $21_l$ (Cf., the aforesaid Kohls U.S. Pat. No. 3,498,403). Whatever the source of the steering command for the lead tractor $21_l$, such command is effective, through conventional steering linkage mechanisms (not shown), to turn each of the wheels associated with the steerable axles 26, 28 (FIG. 1) through a steering angle $\beta$. For simplicity, the steering angle $\beta$ for the trailing tractor—the particular steering angle discussed hereinbelow—has been illustrated in FIG. 2 as comprising the angle between the centerline of the trailing tractor $21_t$ and a line bisecting the plane of the left front steerable wheel. However, those skilled in the art will appreciate that, in actuality, each of the four steerable wheels associated with the steerable axles 26, 28 will be turned through steering angles that are peculiar to the dimensions and dynamics of the vehicle with a steering angle $\beta$ comprising the weighted average of each individual wheel angle. Therefore, the leading tractor steering angle (not shown in the drawings), which is the steering angle established by the driver or by any suitable control input, would be the weighted average of each individual wheel angle on the front tractor's steerable axles 26, 28 with respect to the front tractor longitudinal centerline.

In accordance with the principal objective of the present invention, there has been provided an automatic guidance control system for controlling an unmanned steerable trailing tractor $21_t$ as a function of the differences in the angles measured between the centerlines passing through the controlled leading tractor $21_l$ and frame 22 on the one hand—viz., the angle $\alpha_1$—and the angles measured between the centerlines passing through the unmanned trailing tractor $21_t$ and frame 22 on the other hand—viz., the angle $\alpha_2$—with those signals representative of the leading centerline angle $\alpha_1$ between the leading tractor and frame being averaged over time and as a function of distance traveled by the articulated vehicle 20 to produce a delayed first signal representative of the time average of the leading centerline angle $\alpha_1$ which is then compared with a second signal representative of the trailing centerline angle $\alpha_2$; and, for maintaining the delayed time averaged leading centerline angle $\alpha_1$ and the trailing centerline angle $\alpha_2$ substantially equal one to another as they traverse the path of vehicular movement, thereby insuring that the unmanned steerable tractor $21_t$ follows essentially the same path 32 as the controlled leading tractor $21_l$ irrespective of curvature in the path of vehicle movement provided only that the curvilinear portions of the path 32 are defined by radii of curvature at least equal to or greater than a minimal turning radius.

To accomplish this, and perhaps as best understood by reference to the functional aspects of the automatic guidance control system as depicted diagrammatically in FIG. 3, it will be appreciated by those skilled in the art that the control inputs to the articulated vehicle 20—as established by, for example, a driver 35—serve to establish the operating overall vehicle dynamics in terms of such parameters as speed or velocity, acceleration, braking and/or steering. In order to measure the leading and trailing centerline angles $\alpha_1$ and $\alpha_2$, conventional leading and trailing angle sensors 36, 38 respectively, which may take the form of "13 bit optical shaft encoders" which measure rotations as small as 0.767 milliradian, are located in the leading and trailing pivotal hitch connections $24_l$ and $24_t$. A conventional odometer 39 (or, if desired, a speedometer) associated with the tag axle 30 (FIG. 1) on the lead tractor $21_l$, is provided for measuring the incremental distances through which the articulated vehicle 20 travels.

The arrangement is such that the signal sensed by the leading angle sensor 36 is fed to a distance (or speed) dependent lagging filter 40 (FIG. 3) where the signal is averaged over time and as a function of the distance traveled; the filter 40 also being provided with an input derived from the odometer (or speedometer) 39. The resulting output signal from the filter 40 comprises a delayed first signal representative of the time average of the leading angle $\alpha_1$ which, after adjustment by a preselected gain constant $G_1$, provides one input to a comparator 41. The comparator 41 derives its second input from a second signal emanating from the trailing angle sensor 38, such second signal also being adjusted by means of a suitable gain constant $G_2$. The output from comparator 41 comprises a third signal which is input to the steering controller 42 for the trailing tractor $21_t$ which, through a suitable conventional steering servo system 44, provides a steering command for the steering linkages (not shown) associated with the steerable axles 26, 28 (FIG. 1) of the trailing tractor $21_t$, thereby providing a further input to the overall vehicle dynamics of the articulated vehicle 20.

Referring to FIG. 4, there has been illustrated in block-and-line form a typical system for providing over-the-road lateral control of the articulated vehicle 20. As here shown, the parameters sensed by the odometer 39, leading and trailing centerline angle sensors 36, 38, and a steering angle sensor 45 (which may also take the form of a "13 bit optical shaft encoder") associated with at least one of the steerable axles 26, 28 associated with the trailing tractor $21_t$, provide inputs to a computer 46; which, in the exemplary form of the system tested, comprised of ROLM 1603 Central Control Computer mounted, for example, on the undercarriage of the central load-supporting frame 22 in any suitable manner (not shown).

In carrying out the present invention, the central control computer 46 processes the input signals detected by the odometer 39 and the leading and trailing centerline angle sensors 36, 38 in accordance with a control guidance law defined by the following control equations:

$$\alpha_{1(lagged)} = XS(k)[\alpha_1 - \alpha_{1(lagged)} - 1] + \alpha_{1(lagged)} - 1; \quad \text{[Eq. I]}$$
$$SR = G_2(\alpha_2) - G_1[\alpha_{1(lagged)}]; \quad \text{[Eq. II]}$$

where: "$\alpha_{1(lagged)}$" is the lagged front tractor angle; "XS" is the incremental distance traveled as measured by the odometer 39; "k" is a filter constant; "$\alpha_{1(lagged)} - 1$" is the previously delayed first signal representative of the time average of the leading angle $\alpha_1$; "$\alpha_1$" and "$\alpha_2$" are signals representative of the leading and trailing tractor centerline angles as measured by the angle sensors 36, 38; "SR" is the steering command for the trailing tractor $21_t$; "$G_1$" is a gain constant for the leading tractor $21_l$; and, "$G_2$" is a gain constant for the trailing tractor $21_t$.

Solving for the steering command "SR", the control guidance law employed in the practice of the present invention, and which is programmed into the computer 46, is as follows:

$$SR = G_2[\alpha_2] - G_1[(XS(k)(\alpha_1 - \alpha_{1(lagged)}) - 1) + \alpha_{1(lagged)} - 1]. \quad [\text{Eq. III}]$$

Thus, the variables "XS", "$A_1$", and "$A_2$" sensed by the odometer 39 and angle sensors 36, 38, respectively, are input to the computer 46, the lagged front tractor angle $\alpha_{1(lagged)}$ is determined by the computer solving Equation I, to average the first signal emanating from the leading angle sensor 36 over time and as a function of the distance traveled as measured by odometer 39, to produce a delayed first signal representative of the time average of the leading angle $\alpha_1$. The delayed first signal is then compared with the second signal derived by angle sensor 38 indicative of the trailing angle $\alpha_2$. Solving of Equation II by the computer 46 produces the steering command SR which is fed through a servo command system 48 and the steering servo 44 to turn the steerable axles 26, 28 of the trailing tractor $21_t$ through a desired steering angle $\beta$ in order to maintain the trailing centerline angle $\alpha_2$ substantially equal to the delayed time averaged leading centerline angle $\alpha_1$. The actual resultant steering angle $\beta$ for the steerable axles 26, 28 of the trailing tractor $21_t$ is sensed by the steering angle sensor 45 which serves to produce a second input to the servo command system 48, thereby providing a closed loop servo system to insure maintenance at all times of the correct steering angle $\beta$ required to maintain the trailing centerline angle $\alpha_2$ substantially equal to the delayed time averaged leading centerline angle $\alpha_1$.

Figure 5:
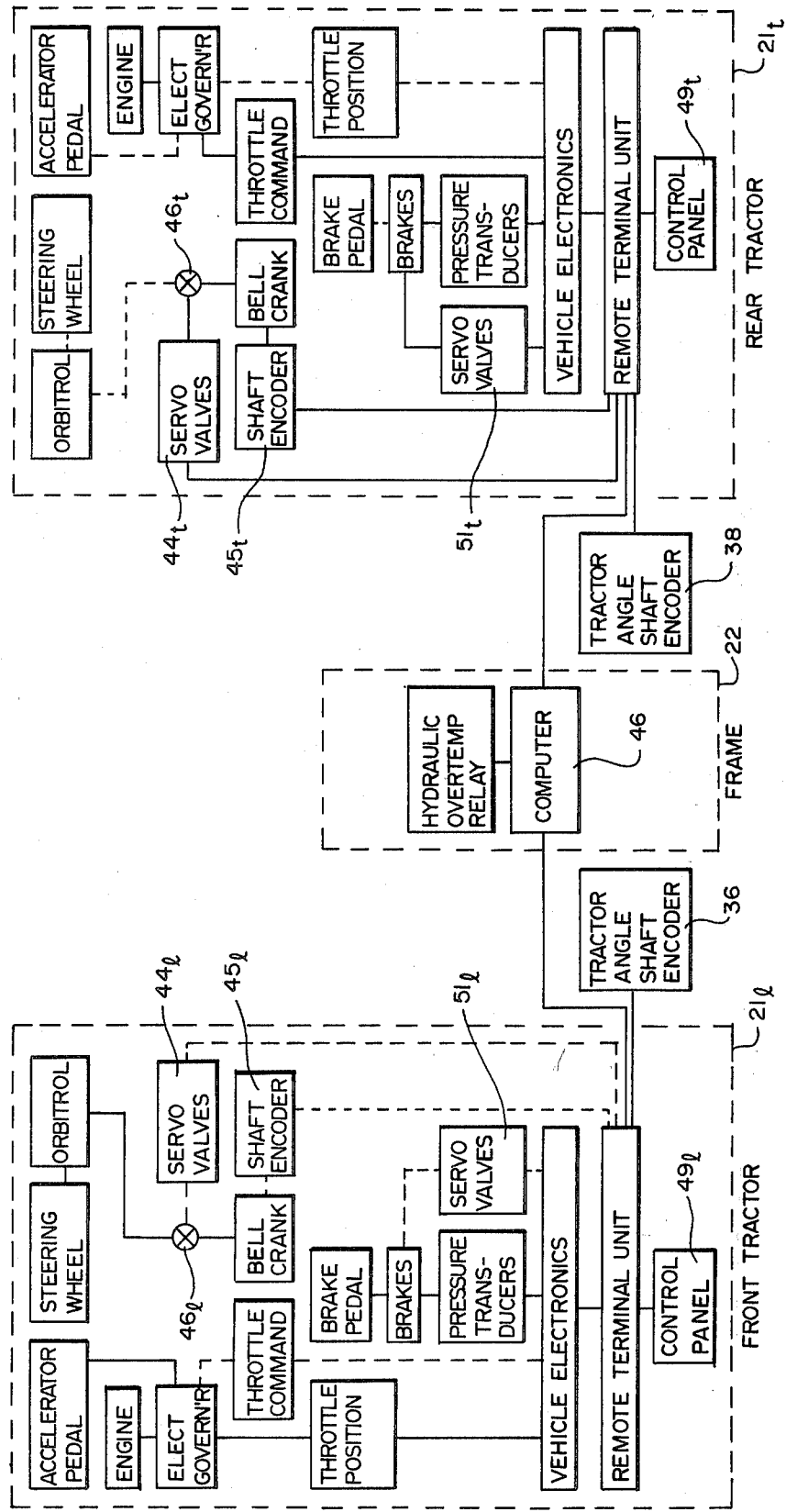
FIG. 5 is a block-and-line drawing illustrating the control parameters utilized to effect steering guidance of an unmanned steerable trailing tractor in response to (i) operator controlled (or automatically controlled) inputs to the leading tractor and (ii) the overall vehicle dynamics induced by such controlled inputs, with the drawing here illustrating in solid lines the flow of control signals assuming that the vehicle is moving in a forward direction, and also illustrating in broken lines the flow of control signals when the direction of vehicular movement is reversed.

Referring to FIG. 5, it will be observed that the steering commands for the trailing vehicle are here provided through the steering servo valves $44_t$ since the trailing vehicle is here assumed to be unmanned and moving in a reverse direction—i.e., the steering servo comprises the actuator for the trailing vehicle's steering system and derives its control signals from a digital-to-analog converter (not shown) in the computer 46. The steering angle $\beta$ is sensed by the shaft encoder $45_t$ and fed to the computer 46 through the rear tractor's Remote Terminal Unit. Brake commands to the trailing tractor are provided by the servo valves $51_t$ which are slaved to brake commands originating in the leading tractor $21_l$, rather than by the rear tractor's brake pedal; while the rear tractor's engine is controlled by the electronic governor through Throttle Commands slaved to the Throttle Position in the lead tractor $21_l$. The leading and trailing centerline angles $\alpha_1$ and $\alpha_2$ are sensed by the tractor angle shaft encoders 36, 38, respectively, which are mounted in the pivotal hitch connections between the frame 22 and the front and rear tractors $21_l$, $21_t$, respectively, as best illustrated by reference to FIGS. 2 and 4.

The arrangement is such that all system actuators—i.e., throttle position, steering, braking—are controlled manually by the driver in the leading tractor, and automatically via the computer and Remote Terminal Units, in the trailing tractor. The steering actuators are hydraulic actuators controlled either by the servo valves $44_l$, $44_t$ or from the steering wheel's orbitrol or metering valve, dependent upon whether the tractor is a "slave" or a "master" vehicle. Similarly, the hydraulically actuated disc brakes accept commands from both the brake pedals and the Remote Terminal Units; while the electronic governors on the diesel engines accept computer commands or accelerator pedal inputs.

Figure 6:
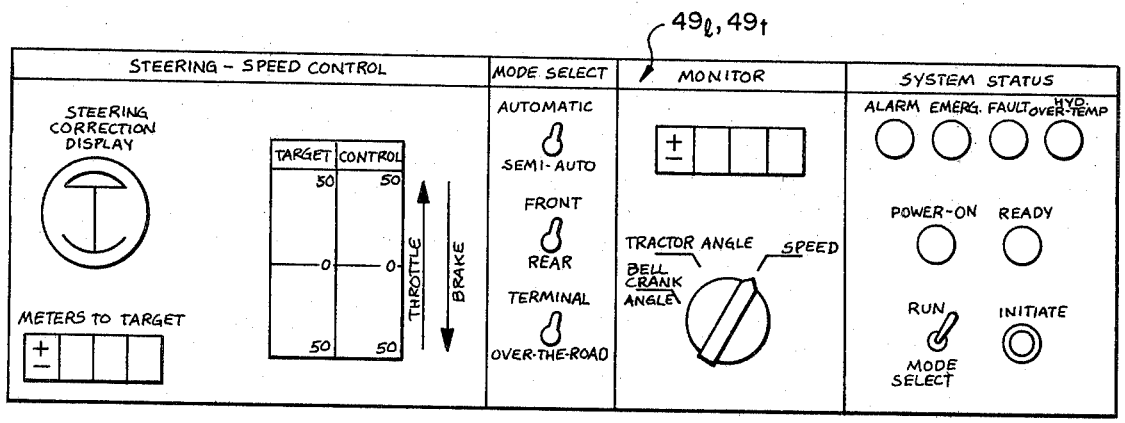
FIG. 6 is a highly simplified view of a typical control panel mounted in both the leading and trailing tractors and suitable for selecting and indicating the operating vehicle mode and vehicle dynamics at any given point in time.

Each tractor $21_1$, $21_t$ is provided with a suitable control panel $49_1$, $49_t$, respectively, which are identical in all respects. Such control panels are illustrated in FIG. 6 and include means for selecting the operating mode—i.e., (i) over-the-road operation vs. operation at the missile shelter or terminal; (ii) which of the two tractors is the "master" and which the "slave" (iii) whether the vehicle is to be operated in the manual, automatic or semi-automatic mode; (iv) whether the vehicle is moving in a forward direction or a reverse direction; etc. In the semi-automatic mode, the command signals from the "master" vehicle $21_1$ are displayed on the control panel $49_t$ of the "slave" vehicle $21_t$ so that a second driver located in the cab of the "slave" vehicle can monitor those commands and implement them as required.

Figure 7:
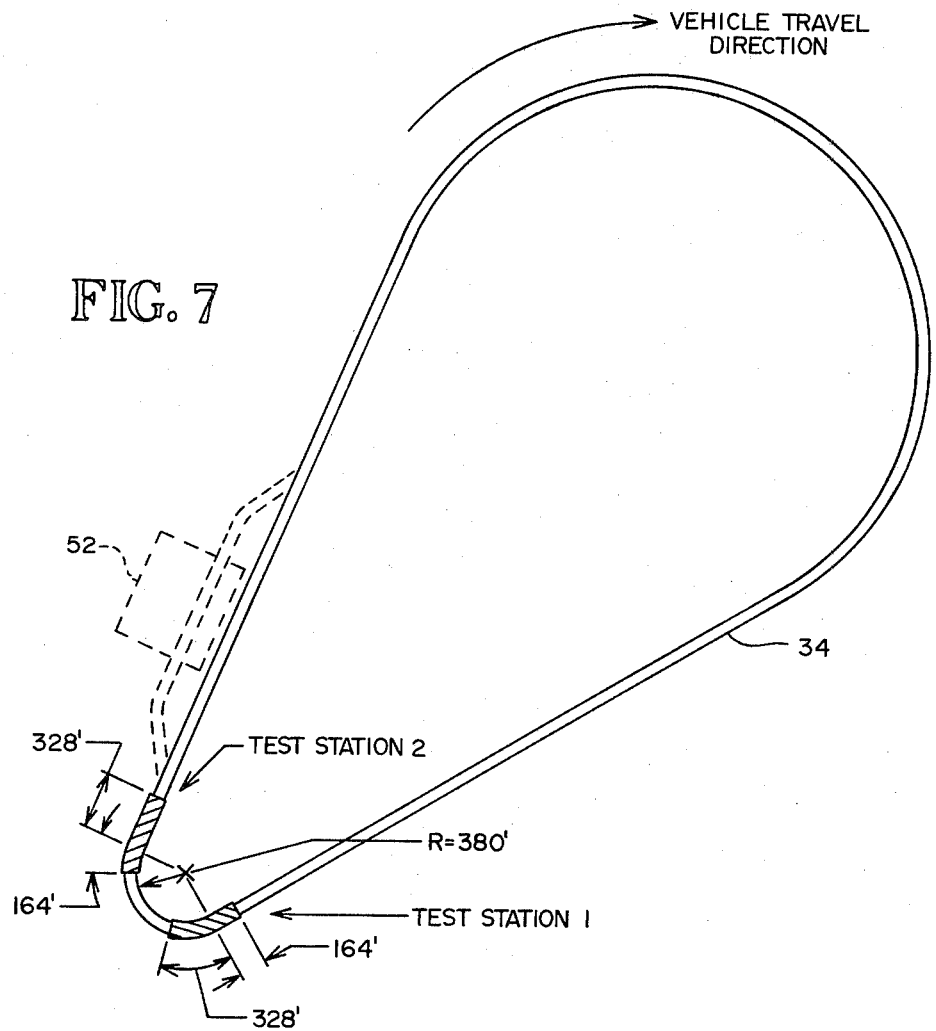
FIG. 7 is a plan view of an exemplary test track over which a relatively long articulated ground vehicle to the type shown in FIG. 1 was tested as it moved along both linear and curvilinear paths.

The illustrative vehicle hereinabove described was subjected to extensive testing over a tear drop shaped track of the type illustrated diagrammatically in FIG. 7. As here shown, the track included a relatively sharp turn having a radius of curvature of 380' and a larger turn with a radius of curvature of 1700', with the two turns being interconnected by straight roadway sections. The vehicle 20 traversed the roadbed 34 in a clockwise direction as viewed in the drawing; and, tests were conducted at various points along the path of travel. One Test Station was located at the entrance to the 380' radius curve, and a second Test Station was positioned at the exit from that curve. The test track further included a simulated missile shelter, indicated in broken lines at 52, which forms no part of the present invention and which need not be described in further detail.

Figure 8:
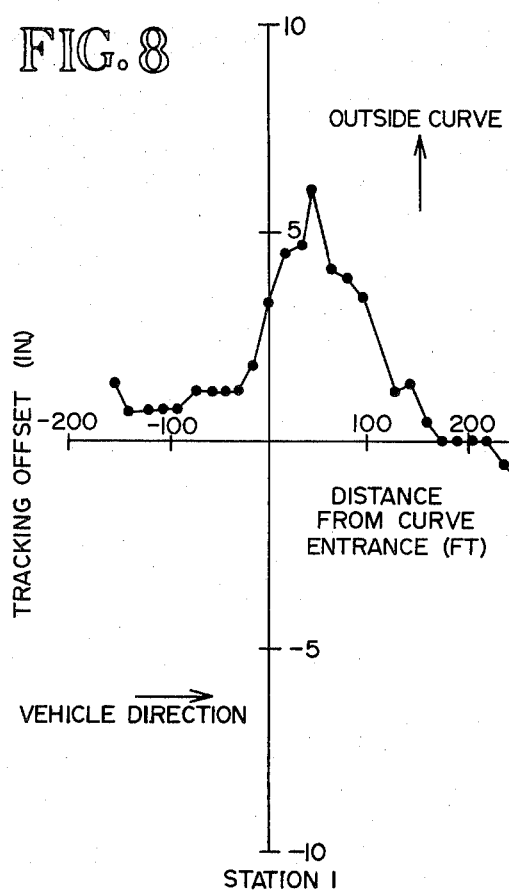
FIG. 8 is a graphic representation of the minimal tracking offset of the unmanned trailing tractor resulting from the practice of the present invention as the vehicle shown in FIG. 1 traversed Test Station 1 depicted in FIG. 7 entering a curve having a 380 foot radius, with the distance measured from the entrance to the curve presented in feet along the abscissa and the degree of tracking offset presented in inches on the ordinate.
Figure 9:
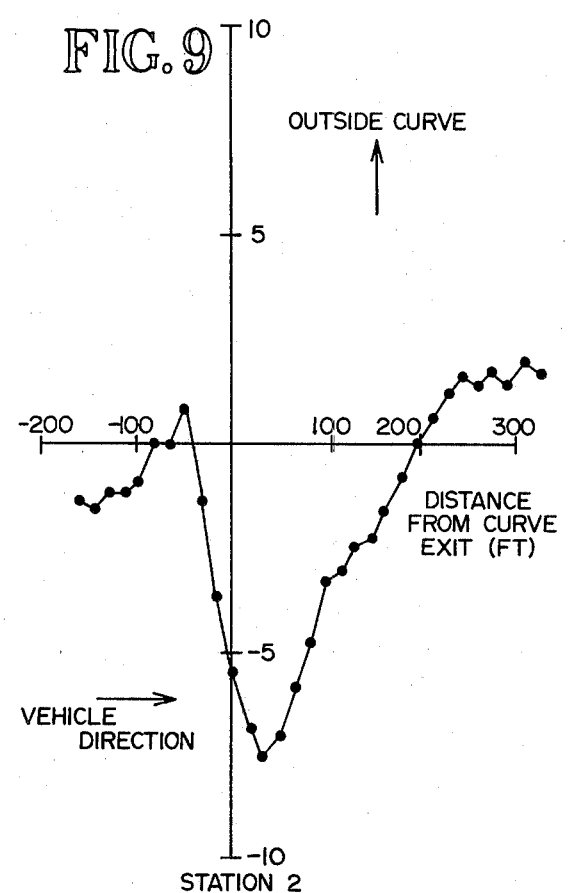
FIG. 9 is a graphic presentation similar to FIG. 8, but here illustrating the degree of tracking offset of the unmanned steerable trailing tractor as it exited from the 380 foot radius curve through Test Station 2 depicted in FIG. 7; and, FIG. 10 is a BODE Magnitude graphic representation of the transfer function from front to rear steering angles at a variety of speeds and vehicular weights, illustrating particularly the magnitude, in decibels, of the ratio of the trailing end steering angle to the leading end steering angle on the ordinate; and, with frequency, normalized as a function of velocity, illustrated on the abscissa.

In actual operation, and as best illustrated by reference to FIG. 8, it will be observed that as the exemplary articulated vehicle 20 (FIG. 1) entered Test Station No. 1 (FIG. 7), the tracking offset of the trailing tractor $21_t$ relative to the prescribed path of movement 32 (Cf. FIG. 2) gradually increased from minimum values to a maximum value of slightly more than 5" to the left of the prescribed path—i.e., outboard of the path—as the trailing vehicle $21_t$ entered the curved road portion at Test Station 1; and, thereafter, the tracking error or offset gradually decreased with the trailing tractor leaving the entrance to the curve only a few inches to the right of the prescribed path—i.e., inboard of the path. As shown in FIG. 9, basically the same results were achieved as the trailing vehicle $21_t$ exited from the 380' radius curve through Test Station 2; although in this instance the maximum tracking error or offset was to the right of the prescribed path—i.e., to the inside of the curve. The deviations or off-tracking offsets attributable to the control guidance system of the present invention were, in all cases, minimal and considered to be entirely acceptable given the nature of the tests and the tremendous size of the articulated vehicle. However, it is believed that with further "fine tuning" of such control constants as "k" (the filter constant), "$G_1$" (the leading tractor gain constant), and "$G_2$" (the trailing tractor gain constant), even greater tracking precision can, and will, be achieved.

Those skilled in the art will readily appreciate that the particular filter constants and/or gain constants employed may vary widely dependent upon such factors as: the weight and size of the articulated vehicle; the speeds at which it is to be operated; the precision required in proper tracking; and, even the proficiency of the driver of the lead tractor $21_1$. However, it has been found that satisfactory results are achieved when the present invention is employed in over-the-road control of an articulated vehicle 20 of the type shown in FIG. 1 for missile deployment where the filter constant "k" for a recursive filter 40 (FIG. 3) is on the order of about 0.5 (with units expressed as "1/meters"), such filter constant having been found to be suitable for both slow speed and high speed operation under the particular conditions tested.

Referring again to FIG. 5, the essential hardware elements included in the steering control guidance system of the illustrative form of the invention have been illustrated in simplified block-and-line form. Thus, it will be noted that the leading or front tractor $21_1$ includes a control panel $49_1$ (illustrated in greater detail in FIG. 6) and the conventional vehicle components such as an engine, brake and accelerator pedals, brakes, electronic governor, throttles, steering wheels, bell cranks, etc. The conventional vehicle as purchased from the manufacturer would normally have the steering wheel connected to the orbitrol to control the steering system; and, the brake pedal connected directly to the brake actuators. The conventional vehicle has, however, here been modified by providing: a closed loop servo valve system for the brakes; a shaft encoder $45_1$, $45_t$ for measuring the steering angle $\beta$; and servo valves $44_1$, $44_t$ for automatic control of steering. Manual or servo control of steering is selected by means of switches $46_1$, $46_t$.

Assuming that the thus modified leading tractor $21_1$ is moving in a forward direction, steering commands are conveyed by actuation of the steering wheel by the driver through the orbital to control the steering system. Since in this mode of operation the leading tractor $21_1$ is the "master" vehicle, the steering servo valves $44_1$ and the shaft encoder $45_1$ are not utilized in the practice of the invention; although, those skilled in the art will appreciate that where the vehicle is operating in a reverse direction, such servo valves $44_1$ and shaft encoder $45_1$ may become operative since in that mode of operation the tractor $21_1$ becomes the trailing vehicle and may very well become the "slave". Similarly, since the driver will be energizing the brakes in the lead tractor $21_1$ by depression of the brake pedal, the brake servo valves $51_1$ are also not utilized while the vehicle is moving in a forward direction. Accelerator pedal and Throttle Position commands are determined by the driver and, hence, are indicated in solid lines; whereas an electronic Throttle Command is illustrated in broken lines since that command would only be employed when the tractor $21_1$ is moving in a reverse direction. The leading tractor commands are routed to the trailing tractor $21_t$ via the Remote Terminal Units and the computer 46, serving to control the rear tractor's steering system via the rear tractor servo valve $44_t$ as monitored by the shaft encoder $45_t$, its brakes via the servo valves $51_t$, and its engine via the rear tractor Throttle Command.

Figure 10:
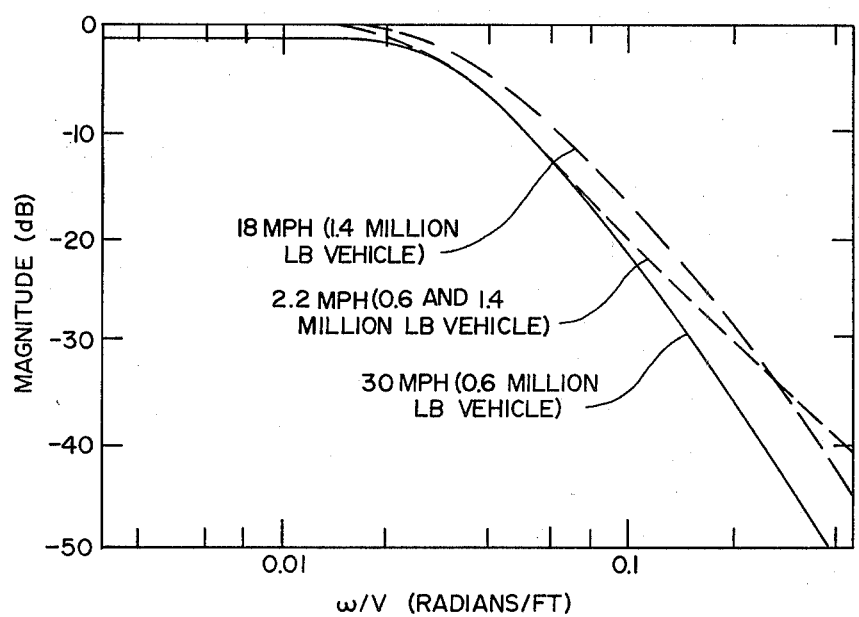

Computer simulations of vehicle dynamics were performed to determine the sensitivity of the system to random disturbances such, for example, as jiggling of the steering wheel by the driver in the lead tractor $21_1$. As illustrated in FIG. 10, where the magnitude, in decibels, of the trailing steering angle $\beta$ with respect to the leading steering angle $\beta$—i.e., the transfer function between front and rear steering angles—is plotted as a function of frequency, it was found that substantially unity gain was achieved at relatively low frequencies, with gain falling off at very high frequencies— precisely the results desired. That is to say, high frequency random disturbances were found to have little, if any, effect upon tracking.

Those skilled in the art will appreciate that there has hereinabove been described a highly effective system for minimizing tracking offset of a trailing steerable support with respect to the steerable leading support in an articuated vehicle, here employing a recursive digital filter 40 (FIG. 3) for the purpose of averaging signals representative of the measured leading centerline angle $\alpha_1$ so as to produce a delayed first signal representative of the time average of the leading angle $\alpha_1$ which can then be compared with a second signal representative of the trailing angle $\alpha_2$. However, it will also be appreciated that the invention can be employed with other than recursive digital filters. For example, it is within the scope of the invention to employ a non-recursive digital filter or, for that matter, an analog filter to produce the desired delayed first signal representative of the time average of the leading angle $\alpha_1$. Indeed, it is also within the scope of the invention to employ a "transport delay" wherein the first signal representative of the leading centerline angle $\alpha_1$ is delayed for an increment of time sufficient to permit the articulated vehicle 20 to move along a prescribed path a distance substantially proportional to the spacing between the leading and trailing pivotal connections $24_1$, $24_t$ (FIGS. 1 and 2), with the delayed first signal measured at the start of the time increment then being compared with a signal representative of the trailing centerline angle $\alpha_2$ measured at the end of the time increment.

Although the present invention has been described principally in connection with the use of a manned or operator controlled leading tractor $21_1$, it is not limited to such operation. Rather, the command signals emanating from the "master" leading tractor $21_1$ which are used for controlling the trailing "slave" tractor $21_t$ may be derived by automatic control of the "master" tractor with the use of vehicle guidance sensors in the lead tractor $21_1$ responsive to guidance control signalling means positioned along the prescribed path of travel.

Moreover, while the invention has herein been described in connection with a long articulated vehicle having a trailing steerable support in the form of a power driven tractor, those skilled in the art will appreciate that the invention might also be used in connection with, for example, long fire engines or the like where the rear of such vehicles have commonly employed a steerable set of wheels with a second "driver" controlling the steering thereof. With the present invention, the rear steerable wheels can now be automatically controlled and no second "driver" will be required.

What is claimed is:

1. The method of automatically steering the steerable wheels of an unmanned wheeled support pivotally connected to the trailing end of a center frame forming part of a long articulated ground vehicle in response to overall vehicle dynamics including the vehicle dynamics of a controlled power driven wheeled support having steerable wheels and pivotally secured to the leading end of the center frame of the articulated vehicle; said method comprising the steps of:

(a) measuring a parameter indicative of the distance traveled by the vehicle;

(b) measuring the leading angle $\alpha_1$ between the longitudinal centerlines passing through the center frame and the controlled support as the vehicle traverses a path which is, at least in part, curvilinear so as to produce a first signal representative of the leading angle $\alpha_1$;

(c) averaging the first signal representative of the leading angle $\alpha_1$ over time and as a function of the distance traveled to produce a delayed first signal representative of the time average of the leading angle $\alpha_1$;

(d) measuring the trailing angle $\alpha_2$ between the longitudinal centerlines passing through the center frame and the unmanned support so as to produce a second signal representative of the trailing angle $\alpha_2$;

(e) comparing the second signal representative of the trailing angle $\alpha_2$ with the delayed first signal representative of the time average of the leading angle $\alpha_1$ and producing a third signal representative of the angular difference between the trailing angle $\alpha_2$ and the time average of the leading angle $\alpha_1$; and, (f) utilizing the third signal to govern a steering controller in the unmanned support for steering the unmanned support through a steering angle $\beta$ sufficient to maintain the trailing angle $\alpha_2$ substantially equal to the time average of the leading angle $\alpha_1$ so that the unmanned support travels over substantially the same path as the controlled support as the articulated ground vehicle traverses the path.

2. The method as set forth in claim 1 wherein the controlled power driven wheeled support is a manned operator-controlled vehicle.

3. The method as set forth in claim 1 wherein the controlled power driven wheeled support is an unmanned automatically-controlled vehicle.

4. The method as set forth in claim 1 wherein the controlled power driven wheeled support is a tractor.

5. The method as set forth in claim 4 wherein the unmanned support is a tractor.

6. The method as set forth in claim 5 wherein the controlled support and the unmanned support are oppositely directed.

7. The method as set forth in claim 6 wherein the controlled support is capable of moving at "x" speeds in a forward direction and "y" speeds in a reverse direction and the unmanned support is capable of moving at "x" speeds in a reverse direction and "y" speeds in a forward direction, where "x" and "y" are any selected whole integers.

8. The method as set forth in claims 1 or 7 wherein motive power is provided for both the controlled support and the unmanned support with acceleration, throttle and brake commands for the unmanned support being slaved to the corresponding commands for the controlled support.

9. The method as set forth in claim 1 wherein an odometer is utilized to measure the distance parameter.

10. The method as set forth in claim 1 wherein the steering controller in the unmanned support is servo operated.

11. The method as set forth in claims 1, 2, 3, 4, 5 or 6 wherein averaging of the first signal in step (c) to produce a delayed first signal representative of the time average of the leading angle $\alpha_1$ is accomplished with an analog filter.

12. The method as set forth in claims 1, 2, 3, 4, 5 or 6 wherein averaging of the first signal in step (c) to produce a delayed first signal representative of the time average of the leading angle $\alpha_1$ is accomplished with a non-recursive digital filter.

13. The method as set forth in claims 1, 2, 3, 4, 5 or 6 wherein averaging of the first signal in step (c) to produce a delayed first signal representative of the time average of the leading angle $\alpha_1$ is accomplished with a recursive digital filter.

14. The method as set forth in claims 1, 2, 3, 4, 5 or 6 wherein the distance parameter measured in step (a), the first and second signals respectively produced in steps (b) and (d), the delayed first signal representative of the time average of the leading angle $\alpha_1$ produced in step (c), and the comparison set forth in step (e), are steps performed in accordance with a control guidance law for providing steering commands for the trailing support and wherein the control guidance law comprises:

$$SR = G_2[\alpha_2] - G_1[XS(k)(\alpha_1 - \alpha_{1(lagged)} - 1) + \alpha_{1(lagged)} - 1];$$

where "SR" is the rear support steering command, "$G_1$" is a gain constant for the leading support, "$G_2$" is a gain constant for the trailing support, "XS" is the incremental distance ytraveled as measured in step (a), "k" is a filter constant, "$\alpha_1$" and "$\alpha_2$" are, respectively, the leading and trailing centerline angles, and "$\alpha_{1(lagged)} - 1$" is the previously delayed first signal representative of the time average of the leading angle $\alpha_1$.

15. The method of automatically steering the steerable wheels of an unmanned wheeled support pivotally connected to the trailing end of a center frame forming part of a long articulated ground vehicle in response to overall vehicle dynamics including the vehicle dynamics of a controlled power driven wheeled support having steerable wheels and pivotally secured to the leading end of the center frame of the articulated vehicle; said method comprising the steps of:

(a) measuring a parameter indicative of the distance traveled by the vehicle;

(b) measuring the leading angle $\alpha_1$ between the longitudinal centerlines passing through the center frame and the controlled support as the vehicle traverses a path which is, at least in part, curvilinear so as to produce a first signal representative of the leading angle $\alpha_1$;

(c) delaying the first signal representative of the leading angle $\alpha_1$ for a time increment sufficient to permit the articulated vehicle to move a distance substantially proportional to the longitudinal spacing between the points of pivotal connection of the center frame to both the controlled support and the unmanned support;

(d) measuring the trailing angle $\alpha_2$ between the longitudinal centerlines passing through the center frame and the unmanned support so as to produce a second signal representative of the trailing angle $\alpha_2$;

(e) comparing the second signal representative of the trailing angle $\alpha_2$ at the end of the time increment with the delayed first signal measured at the beginning of the time increment and producing a third signal representative of the angular difference between the trailing angle $\alpha_2$ and the delayed leading angle $\alpha_1$; and, (f) utilizing the third signal to govern a steering controller in the unmanned support for steering the unmanned support through a steering angle $\beta$ sufficient to maintain the trailing angle $\alpha_2$ at the end of the time increment substantially equal to the delayed leading angle $\alpha_1$ as measured at the beginning of the time increment so that the unmanned support travels over substantially the same path as the controlled support as the articulated ground vehicle traverses the path.

16. The method as set forth in claim 15 wherein the controlled power driven wheeled support is a manned operator controlled vehicle.

17. The method as set forth in claim 15 wherein the controlled power driven wheeled support is an unmanned automatically controlled vehicle.

18. The method as set forth in claim 15 wherein the controlled power driven wheeled support is a tractor.

19. The method as set forth in claim 18 wherein the unmanned support is a tractor.

20. The method as set forth in claim 19 wherein the controlled support and the unmanned support are oppositely directed.

21. In a power driven relatively long articulated ground vehicle of the type having a central frame, a first steerable wheeled support pivotally connected to and supporting the leading end of the central frame, and a second steerable wheeled support pivotally connected to and supporting the trailing end of the central frame, an improved steering control guidance system for maintaining the first and second steerable wheeled supports on substantially the same path, irrespective of curvature, as the articulated vehicle traverses a prescribed path which is, at least in part, curvilinear having curved portions defined by radii of curvature at least equal to the minimum turning radius of the vehicle; said control guidance system comprising, in combination:

(a) means for providing motive power to at least said first steerable wheeled support for driving said vehicle;

(b) control means for steering said first wheeled support;

(c) means for measuring a parameter representative of the distance traveled by said vehicle;

(d) means for measuring the leading angle $\alpha_1$ between the longitudinal centerline passing through said frame and said first support and for producing a first signal representative of said leading angle $\alpha_1$;

(e) means for averaging said first signal over time and as a function of the distance traveled to produce a delayed first signal representative of the time average of said leading angle $\alpha_1$;

(f) means for measuring the trailing angle $\alpha_2$ between the longitudinal centerlines passing through said frame and said second support and for producing a second signal representative of said trailing angle $\alpha_2$;

(g) comparator means for comparing said second signal representative of said trailing angle $\alpha_2$ with said delayed first signal representative of the time average of said leading angle $\alpha_1$ and for producing a third signal representative of the angular difference between said trailing angle $\alpha_2$ and the time average of said leading angle $\alpha_1$; and (h) control means responsive to said third signal for automatically steering said second support through a steering angle $\beta$ sufficient to maintain said trailing angle $\alpha_2$ substantially equal to the time average of said leading angle $\alpha_1$ so that said second support travels over substantially the same path as said first support as said articulated ground vehicle traverses said prescribed path.

22. A control guidance system as set forth in claim 21 wherein said first wheeled support is a manned operator-controlled vehicle.

23. A control guidance system as set forth in claim 21 wherein said first wheeled support is an unmanned automatically-controlled vehicle.

24. A control guidance system as set forth in claim 21 wherein said first wheeled support is a tractor.

25. A control guidance system as set forth in claim 24 wherein said second support is a tractor.

26. A control guidance system as set forth in claim 25 wherein said first support and said second support are oppositely directed.

27. A control guidance system as set forth in claim 26 wherein said first support is capable of moving at "x" speeds in a forward direction and "y" speeds in a reverse direction and said second support is capable of moving at "x" speeds in a reverse direction and "y" speeds in a forward direction, where "x" and "y" are any selected whole integers.

28. A control guidance system as set forth in claims 21 or 27 wherein motive power is provided for both said first support and said second support with acceleration, throttle and brake commands for said second support being slaved to the corresponding commands for said first support.

29. A control guidance system as set forth in claim 21 wherein an odometer is utilized to measure the distance parameter.

30. A control guidance system as set forth in claim 21 wherein said control means in said second support is servo operated.

31. A control guidance system as set forth in claims 21, 22, 23, 24, 25 or 26 wherein an analog filter is provided for averaging said first signal to produce said delayed first signal representative of the time average of said leading angle $\alpha_1$.

32. A control guidance system as set forth in claims 21, 22, 23, 24, 25 or 26 wherein a non-recursive filter is provided for averaging said first signal to produce said delayed first signal representative of the time average of said leading angle $\alpha_1$.

33. A control guidance system as set forth in claims 21, 22, 23, 24, 25 or 26 wherein a recursive digital filter is provided for averaging said first signal to produce said delayed first signal representative of the time average of said leading angle $\alpha_1$.

34. A control guidance system as set forth in claims 21, 22, 23, 24, 25 or 26 wherein said distance parameter, said first and second signals, said delayed first signal representative of the time average of said leading angle $\alpha_1$, and said comparator means, are operated in accordance with a control guidance law for providing steering commands for said trailing support and wherein said control guidance law comprises:

$$SR = G_2[\alpha_2] - G_1[XS(k)(\alpha_1 - \alpha_{1(lagged)} - 1) + \alpha_{1(lagged)} - 1];$$

where "SR" is the steering command for said rear support, "$G_1$" is a gain constant for said leading support, "$G_2$" is a gain constant for said trailing support, "XS" is the incremental distance traveled, "k" is a filter constant, "$\alpha_1$" and "$\alpha_2$" are, respectively, said leading and trailing centerline angles, and "$\alpha_{1(lagged)}-1$" is the previously delayed first signal representative of the time average of said leading angle $\alpha_1$.

35. A control guidance system for automatically steering the steerable wheels of an unmanned wheeled support pivotally connected to the trailing end of a center frame forming part of a long articulated ground vehicle in response to overall vehicle dynamics including the vehicle dynamics of a controlled power driven wheeled support having steerable wheels and pivotally secured to the leading end of the center frame of the articulated vehicle; said control guidance system comprising, in combination:
 (a) means for measuring a parameter indicative of the distance traveled by said vehicle;
 (b) means for measuring the leading angle $\alpha_1$ between the longitudinal centerlines passing through said center frame and said controlled support as said vehicle traverses a path which is, at least in part, curvilinear so as to produce a first signal representative of said leading angle $\alpha_1$;
 (c) means for delaying said first signal representative of said leading angle $\alpha_1$ for a time increment sufficient to permit said articulated vehicle to move a distance substantially proportional to the longitudinal spacing between said pivotal connections of said center frame to both said controlled support and said unmanned support;
 (d) means for measuring the trailing angle $\alpha_2$ between the longitudinal centerlines passing through said center frame and said unmanned support so as to produce a second signal representative of said trailing angle $\alpha_2$;
 (e) means for comparing said second signal representative of said trailing angle $\alpha_2$ at the end of said time increment with said delayed first signal measured at the beginning of said time increment, and for producing a third signal representative of the angular difference between said trailing angle $\alpha_2$ and said delayed leading angle $\alpha_1$; and,
 (f) control means responsive to said third signal for automatically steering said unmanned support through a steering angle $\beta$ sufficient to maintain said trailing angle $\alpha_2$ at the end of said time increment substantially equal to said delayed leading angle $\alpha_1$ as measured at the beginning of said time increment so that said unmanned support travels over substantially the same path as said controlled support as said articulated ground vehicle traverses said path.

36. A control guidance system as set forth in claim 36 wherein said controlled power driven wheeled support is a manned operator controlled vehicle.

37. A control guidance system as set forth in claim 35 wherein said controlled power driven wheeled support is an unmaned automatically controlled vehicle.

38. A control guidance system as set forth in claim 35 wherein said controlled power driven wheeled support is a tractor.

39. A control guidance system as set forth in claim 38 wherein said unmanned support is a tractor.

40. A control guidance system as set forth in claim 39 wherein said controlled support and said unmanned support are oppositely directed.

* * * * *